United States Patent
Grimm et al.

(10) Patent No.: US 11,427,497 B2
(45) Date of Patent: Aug. 30, 2022

(54) TOUGHENABLE GLASS WITH HIGH HYDROLYTIC RESISTANCE AND REDUCED COLOR TINGE

(71) Applicant: SCHOTT AG, Mainz (DE)

(72) Inventors: Malte Grimm, Mitterteich (DE); Rainer Eichholz, Frankfurt (DE)

(73) Assignee: SCHOTT AG, Mainz (DE)

( * ) Notice: Subject to any disclaimer, the term of this patent is extended or adjusted under 35 U.S.C. 154(b) by 105 days.

(21) Appl. No.: 17/091,566

(22) Filed: Nov. 6, 2020

(65) Prior Publication Data
US 2021/0139365 A1 May 13, 2021

(30) Foreign Application Priority Data
Nov. 8, 2019 (EP) .................................. 19208145

(51) Int. Cl.
| | | |
|---|---|---|
| B32B 15/04 | (2006.01) | |
| B32B 17/06 | (2006.01) | |
| C03C 3/11 | (2006.01) | |
| A61J 1/14 | (2006.01) | |
| A61J 1/06 | (2006.01) | |
| C03C 4/18 | (2006.01) | |
| C03C 4/20 | (2006.01) | |
| C03C 3/087 | (2006.01) | |

(52) U.S. Cl.
CPC ............... *C03C 3/11* (2013.01); *A61J 1/06* (2013.01); *A61J 1/1468* (2015.05); *C03C 4/18* (2013.01); *C03C 4/20* (2013.01); *C03C 3/087* (2013.01); *C03C 2204/00* (2013.01)

(58) Field of Classification Search
CPC ........ C03C 4/20; C03C 2204/00; C03C 3/087
USPC ................................................. 428/426, 410
See application file for complete search history.

(56) References Cited

U.S. PATENT DOCUMENTS

| | | | | |
|---|---|---|---|---|
| 7,538,050 | B2 * | 5/2009 | Takagi | C03C 3/085 501/27 |
| 2013/0316162 | A1 * | 11/2013 | Murata | C03C 3/087 428/220 |
| 2014/0017499 | A1 * | 1/2014 | Yamamoto | C03C 21/002 501/71 |
| 2015/0166400 | A1 * | 6/2015 | Yamamoto | C03C 3/087 428/410 |
| 2015/0246846 | A1 * | 9/2015 | Choju | C03C 3/091 428/34.4 |
| 2016/0107924 | A1 * | 4/2016 | Yamamoto | C03C 3/087 501/67 |
| 2017/0023726 | A1 * | 1/2017 | Wada | C03C 3/11 |
| 2017/0283302 | A1 * | 10/2017 | Choju | C03C 3/091 |
| 2018/0208496 | A1 * | 7/2018 | Kimura | C03C 3/091 |
| 2018/0257975 | A1 * | 9/2018 | Kimura | C03B 23/09 |

(Continued)

FOREIGN PATENT DOCUMENTS

| | | |
|---|---|---|
| EP | 2666756 | 11/2013 |
| WO | 2014021142 | 2/2014 |

*Primary Examiner* — Lauren R Colgan
(74) *Attorney, Agent, or Firm* — Ruggiero McAllister & McMahon LLC

(57) ABSTRACT

Glasses and glass products suitable for pharmaceutical packaging are provided and methods of making and using such glass and glass products are provided. The glasses combine chemical temperability with very good hydrolytic resistance as well as reduced color tinge. The invention also includes methods for the production of such glasses and their uses.

21 Claims, 2 Drawing Sheets

(56) References Cited

U.S. PATENT DOCUMENTS

| | | | | |
|---|---|---|---|---|
| 2018/0354842 A1* | 12/2018 | Kato | .......................... | C03C 3/11 |
| 2020/0140312 A1* | 5/2020 | Yokota | ...................... | C03C 4/02 |
| 2020/0283331 A1* | 9/2020 | Arai | .......................... | C03C 4/02 |
| 2020/0407266 A1* | 12/2020 | Suzuki | .................... | C03C 3/091 |

* cited by examiner

TOUGHENABLE GLASS WITH HIGH HYDROLYTIC RESISTANCE AND REDUCED COLOR TINGE

CROSS REFERENCE TO RELATED APPLICATIONS

This application claims benefit under 35 USC § 119 of European Application 19208145.3 filed Nov. 8, 2019, the entire contents of which are incorporated herein by reference.

BACKGROUND

1. Field of the Invention

The invention relates to glasses and glass products, in particular suitable for pharmaceutical packaging. The glasses combine chemical temperability with very good hydrolytic resistance as well as reduced color tinge. The invention also includes methods for the production of such glasses and their uses.

2. Description of Related Art

Glass articles used in the medical, especially pharmaceutical, field must meet stringent quality criteria. Articles for pharmaceutical primary packaging such as vials, ampoules, cartridges and syringes must exhibit high transparency, good sterilizability and excellent chemical resistance. Furthermore, the glass must not change the quality of the material contained by or in contact with it in such a way that prescribed thresholds are exceeded, i.e. the glass material must not release any substances in quantities which, for example, impair the efficacy and stability of a contained drug or even render it toxic. Glasses for pharmaceutical packaging such as pharmaceutical containers also require high mechanical stability and durability, for example to avoid breakage of glass bottles with medical drugs.

It is therefore desirable, to provide glass with improved hydrolytic resistance combined with high mechanical stability suitable for pharmaceutical containers. Such desired glass should in particular exhibit high transparency and at the same time should be producible in a cost-efficient manner.

In order to provide glasses with higher mechanical resistance, it is known to temper them, in particular to temper them chemically. For this purpose, the glass is subjected to an ion exchange to form a compressive stress layer that prevents mechanical damage and is therefore much more resistant to damage. The ion exchange process works in such a way that, at the glass surface, smaller alkali metal ions, such as for instance sodium and/or lithium ions, are exchanged for larger alkali metal ions, such as potassium ions. The duration and temperature of the ion exchange process determines the exchange layer depth. If this ion exchange depth exceeds the depth of damage to the surface of the product during use, breakage is prevented.

Chemical tempering under ion exchange is carried out, for example, by immersion in a potassium-containing salt melt. It is also possible to use an aqueous potassium silicate solution, paste or dispersion, or to perform ion exchange by vapor deposition or temperature-activated diffusion. The first of the above-named methods is generally preferred.

Compressive stress layers are characterized by the parameters compressive stress and penetration depth.

Compressive stress (CS) ("Pressure stress" or "surface stress") is the stress that results from the displacement effect on the glass network through the glass surface after ion exchange, while no deformation occurs in the glass.

"Penetration depth" or "depth of ion exchanged layer" or "ion exchange depth" ("depth of layer" or "depth of ion exchanged layer", DoL) is the thickness of the glass surface layer in which ion exchange occurs and compressive stress is generated. The compressive stress CS and the penetration depth DoL can be measured optically, using the commercially available stress meter FSM6000.

"Diffusivity" D (also known as "threshold diffusivity D") can be calculated from DoL and chemical tempering time t according to the following formula: $DoL=1.4*sqrt(4*D*t)$. In this disclosure, D will be given for chemical tempering in $KNO_3$ at 450° C. for 9 hours. The indication of a diffusivity does not mean that the respective article has undergone chemical tempering. The diffusivity describes the susceptibility of the article to chemical tempering in case of optional chemical tempering.

Ion exchange therefore means that the glass is hardened or chemically tempered by ion exchange processes, a process that is well known to the person skilled in the art in the field of glass making and processing. The typical salt used for chemical tempering is, for example, $K^+$-containing molten salt or mixtures of salts. Salts conventionally used include $KNO_3$, $KCl$, $K_2SO_4$ or $K_2Si_2O_5$. Additives such as $NaOH$, $KOH$ and other sodium salts or potassium salts are also used to better control the rate of ion exchange for chemical tempering. The glass composition has a large influence on the penetration depths and surface stresses to be achieved.

Glasses frequently used in the pharmaceutical industry are borosilicate glasses (so-called neutral glasses), with the principal components silicon oxide and boron oxide, but which may also contain aluminum, alkali metal and alkaline earth oxides.

In certain medical and especially pharmaceutical applications, chemically tempered glass articles, such as glass containers, of aluminosilicate glass play an important role. Aluminosilicate glasses are advantageous so that the glass article can be tempered and can exhibit a high mechanical stability. The disadvantage of aluminosilicate glasses known from the state of the art, however, is that they provide poor hydrolytic resistance compared to for example borosilicate glasses. However, borosilicate glasses cannot be tempered as good as aluminum silicate glasses. Another disadvantage of aluminum silicate glasses of the state of the art is that in order to provide glasses with high transparency, cost-intensive raw materials are needed. If less cost-intensive raw materials are used, the glasses often exhibit an undesired color tinge.

SUMMARY

The object of the present invention is therefore to avoid the above-mentioned disadvantages of the prior art and to provide a glass which has good hydrolytic resistance combined with good mechanical strength suitable for use in the medical, especially pharmaceutical, field. In particular, the glass article should be suitable for use as a pharmaceutical primary packaging and exhibit high transparency with low color tinge, whilst at the same time be producible with less cost-intensive raw materials.

In a first aspect, the invention provides a silicate glass, wherein said glass has a threshold diffusivity D of at least 6 $\mu m^2$/hour, a hydrolytic resistance class I (HGA1 according to ISO720:1985 or type I according to USP660/Glass Grains) and wherein the glass has a $Fe_2O_3$ content of at least 0.0012 mol-% (12 ppm).

In a second aspect, the invention provides a silicate glass, wherein the sum of the z-value and x-value is higher than the y-value by a factor of at least 1.5 according to the CIE 1931 color space at a sample thickness of 1 mm and wherein the glass has a hydrolytic resistance class I (HGA1 according to ISO720:1985 or type I according to USP660/Glass Grains). The CIE 1931 color space represents a color impression by a combination of three values, namely the x-value, the y-value and the z-value.

In a third aspect, the invention provides a silicate glass, wherein said glass has a threshold diffusivity D of at least 6 $\mu m^2$/hour; wherein the glass has a hydrolytic resistance class I (HGA1 according to ISO720:1985 or type I according to USP660/Glass Grains); and wherein the sum of the z-value and x-value is higher than the y-value by a factor of at least 1.5 according to the CIE 1931 color space at a sample thickness of 1 mm.

The present invention also relates to the use of a glass of the invention for the production of vessels, in particularly pharmaceutical vessels.

In an aspect, the present invention relates to a method for the production of a glass of the invention comprising the steps: melting of glass raw materials, cooling of the obtained glass.

In an aspect, the present invention relates to a method for the production of a glass of the invention comprising the step: processing a glass melt, in particular by means of down draw, overflow fusion, redrawing, floating or a tube drawing method, in particular the Danner process, the Vello process or Vertical draw.

In some aspects, the method comprises the step of: toughening the glass by physical and/or chemical toughening.

The glass of the invention can be in any form. The glass according to the invention can be, for example, a glass container, a glass sheet, a glass plate, a glass rod, a glass tube, a glass block or another article that is useful in, for example, the pharmaceutical or medical field.

The invention also relates to pharmaceutical primary packaging comprising the glass of the invention. The pharmaceutical primary packaging is preferably selected from bottles, for example large or small bottles, such as injection bottles or vials, ampoules, cartridges, bottles, flasks, phials, beakers or syringes.

The term "pharmaceutical primary packaging" is to be understood as packaging made of glass that comes into direct contact with a medicament. The packaging protects the medicament from environmental influences and maintains the medicament according to its specification until it is used by the patient.

The invention also relates to a pharmaceutical product, including the glass of the invention, and a drug formulation. The drug formulation may contain a biological drug, such as an antibody, enzyme, protein, peptide or the like, and one or more pharmaceutically acceptable excipients.

The glass in accordance with the invention may also be an intermediate product in the manufacture of another glass article, such as tubular glass in the form of semi-finished products, for example for further processing into pharmaceutical primary packaging.

In the following, the present invention is described in greater detail with reference to example embodiments and comparative examples, which illustrate the teaching of the invention but are not intended to restrict it.

DETAILED DESCRIPTION

Figure 1:
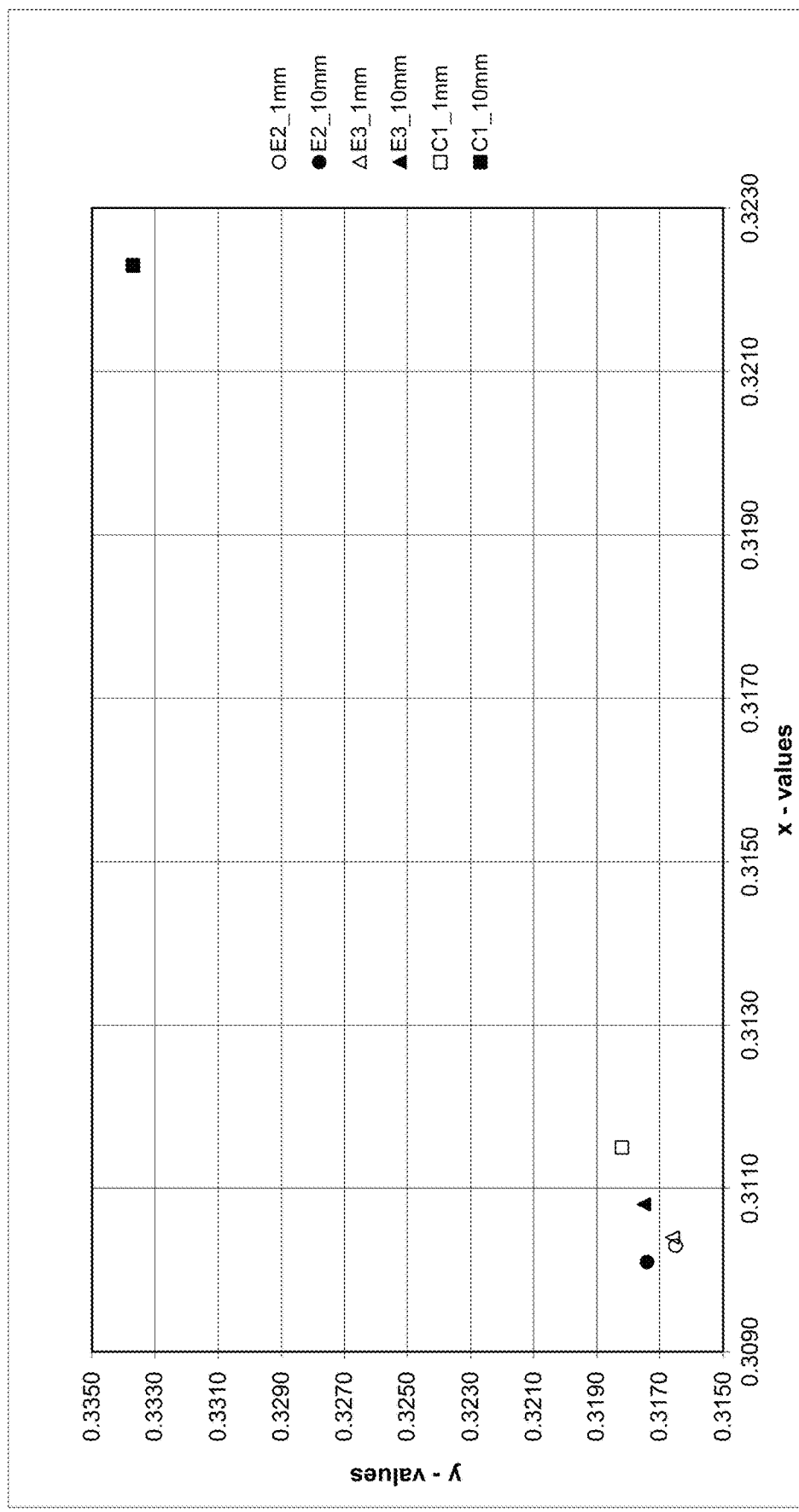
FIG. 1 shows the position of example glasses and comparative examples in the CIE 1931 color space.

A glass which has good hydrolytic resistance combined with good mechanical strength suitable for use in the medical, especially pharmaceutical, field is provided. In particular, the glass article is suitable for use as a pharmaceutical primary packaging and exhibit high transparency with low color tinge, whilst at the same time be producible with less cost-intensive raw materials.

In a first aspect, the invention provides a silicate glass, wherein said glass has a threshold diffusivity D of at least 6 $\mu m^2$/hour, a hydrolytic resistance class I (HGA1 according to ISO720:1985 or type I according to USP660/Glass Grains) and wherein the glass has a $Fe_2O_3$ content of at least 0.0012 mol-% (12 ppm).

In a second aspect, the invention provides a silicate glass, wherein the sum of the z-value and x-value is higher than the y-value by a factor of at least 1.5 according to the CIE 1931 color space at a sample thickness of 1 mm and wherein the glass has a hydrolytic resistance class I (HGA1 according to ISO720:1985 or type I according to USP660/Glass Grains). The CIE 1931 color space represents a color impression by a combination of three values, namely the x-value, the y-value and the z-value.

In a third aspect, the invention provides a silicate glass, wherein said glass has a threshold diffusivity D of at least 6 $\mu m^2$/hour; wherein the glass has a hydrolytic resistance class I (HGA1 according to ISO720:1985 or type I according to USP660/Glass Grains); and wherein the sum of the z-value and x-value is higher than the y-value by a factor of at least 1.5 according to the CIE 1931 color space at a sample thickness of 1 mm.

The glass of this invention is preferably chemically temperable. The expression "chemically temperable" means that the glass can be chemically tempered, i.e. it is susceptible to chemical tempering. The degree of susceptibility to chemical tempering is given as diffusivity D. The terms "tempering, temperable and tempered" on the one hand and the terms "toughening, toughenable and toughened" on the other hand are used interchangeably in the present disclosure.

Preferably, the glass of the invention has a threshold diffusivity D of at least 6 $\mu m^2$/hour. In embodiments, diffusivity ranges from 8 $\mu m^2$/h to 50 $\mu m^2$/h, from 10 $\mu m^2$/h to 35 $\mu m^2$/h, or from 15 $\mu m^2$/h to 30 $\mu m^2$/h. Some preferred glasses have diffusivities from 20 $\mu m^2$/h to 25 $\mu m^2$/h. Preferably, the glass of the invention has a threshold diffusivity D of at least at least 6 $\mu m^2$/hour, more preferably at least 8 $\mu m^2$/h, more preferably at least 10 $\mu m^2$/h, more preferably at least 15 $\mu m^2$/h, more preferably at least 20 $\mu m^2$/h. The high threshold diffusivity D of the glasses of the invention is a major advantage as compared to the borosilicate glasses of the prior art commonly used for pharmaceutical packaging.

The glass has a hydrolytic resistance class I (HGA1 according to ISO720:1985 or type I according to USP660/ Glass Grains). The high hydrolytic resistance of the glasses of the invention is particularly advantageous for use as pharmaceutical packaging. The glass of the invention has a hydrolytic resistance corresponding to at most 80%, preferably less than 80%, more preferably less than 79% of the limit type I according to USP660/Glass Grains.

It is a major advantage of the glasses of the invention to combine excellent temperability (in particular high threshold diffusivity D) with excellent hydrolytic resistance.

Generally, a color impression of neutral white is desired, in particular in the field of pharmaceutical packaging. Another color impression, in particular a yellow-brownish color impression is generally regarded as undesired as such a glass appears to be "bad" or even "dirty" to the observer. Furthermore, an undesired color impression of the glass may compromise proper inspection of the content pharmaceutical packages. Therefore, in the prior art, glasses with extremely low content of $Fe_2O_3$ were produced in order to avoid formation of Fe—Ti oxides that lead to a yellow-brownish color impression. Thus, raw materials with very high purity were required in order to keep the content of $Fe_2O_3$ as low as possible. Such raw materials are very expensive.

The present inventors found a way to provide glasses with a good color impression without the need for utilizing very expensive raw materials of high purity. In particular, the glasses of the invention may comprise $Fe_2O_3$ in an amount of at least 12 ppm (based on Mol-%), for example at least 20 ppm, at least 30 ppm, at least 40 ppm, more than 50 ppm, at least 60 ppm, at least 70 ppm, at least 80 ppm or at least 90 ppm. However, the amount of $Fe_2O_3$ should not be very high. Preferably, the glass has an $Fe_2O_3$ content of at most 0.1 mol-% (1000 ppm), more preferably at most 500 ppm, more preferably at most 250 ppm, more preferably at most 125 ppm.

The color impression of a glass can be described by the position according to the CIE 1931 color space. Preferably, the glass of the present invention is such that the sum of the z-value and x-value is higher than the y-value by a factor of at least 1.5. Such a glass gives a particular good color impression that is far from the undesired yellow-brownish impression.

Preferably, the glasses of the present invention comprise the following components in the indicated amounts in mol-%:

| component | Mol-% |
|---|---|
| $SiO_2$ | 55-85 |
| $Al_2O_3$ | 5-25 |
| $Na_2O$ | 5-20 |
| $K_2O$ | 0.5-5 |
| CaO | 3.5-20 |
| MgO | 0.1-5 |
| $Fe_2O_3$ | 0.0012-0.1 |
| $TiO_2$ | 0-0.3 |
| $ZrO_2$ | 0.3-10 |
| Cl | 0.1-3 |

Preferably, the glasses of the present invention are aluminosilicate glasses. Aluminosilicate glasses have a particular advantageous threshold diffusivity D as compared to the borosilicate glasses commonly used in the prior art.

The glass is a silicate glass, i.e. it contains substantial amounts of $SiO_2$. $SiO_2$ is preferably contained in the glasses of the invention in an amount of from 55 mol-% to 85 mol-%, more preferably from 60 mol-% to 80 mol-%, more preferably from 65 mol-% to 75 mol-%, more preferably from 65 mol-% to 70 mol-%, more preferably from 66 mol-% to 69 mol-%. If the amount of $SiO_2$ is very low, the chemical resistance may be reduced. If the amount of $SiO_2$ is very high, the processing temperature (German: "Verarbeitungstemperatur (VA)") is increased so that production may be impaired.

Preferably, the glasses of the invention comprise $Al_2O_3$ in an amount of from 5 mol-% to 25 mol-%, more preferably from 7.5 mol-% to 20 mol-%, more preferably from 10 mol-% to 15 mol-%, more preferably from 11 mol-% to 13 mol-%. Aluminosilicate glasses have a particular advantageous threshold diffusivity D as compared to borosilicate glasses. However, the amount of $Al_2O_3$ should not be very high because aluminosilicate glasses often have a higher melting temperature as compared to borosilicate glasses. In particular, the glass may be difficult to melt, a higher energy input may be necessary, and/or shaping may be difficult due to an increased processing temperature (VA) if the amount of $Al_2O_3$ is very high. In contrast, if the amount of $Al_2O_3$ is very low, the chemical resistance may be impaired.

Preferably, the glasses of the invention comprise $Na_2O$ in an amount of from 5 mol-% to 20 mol-%, more preferably from 6 mol-% to 15 mol-%, more preferably from 7 mol-% to 12 mol-%, more preferably from 8 mol-% to 11 mol-%. Such amounts of $Na_2O$ are particularly preferable with respect to chemical tempering. If the amount of $Na_2O$ is very high, the hydrolytic resistance may be impaired due to alkali leaching.

Preferably, the glasses of the invention comprise $K_2O$ in an amount of from 0.5 mol-% to 5 mol-%, more preferably from 0.6 mol-% to 2 mol-%, more preferably from 0.7 mol-% to 1.5 mol-%, more preferably from 0.8 mol-% to 1.3 mol-%. $K_2O$ may improve the devitrification resistance. Furthermore, alkali leaching of $K_2O$ is lower. However, if the amount of $K_2O$ is very high, hydrolytic resistance may be impaired. Moreover, $K_2O$ increases the coefficient of thermal expansion, resulting in lower thermal shock resistance, which may be disadvantageous also during further processing. High amounts of $K_2O$ can also interfere with the ion exchange capability of the glass and reduce diffusivity and/or the penetration depth (DoL) upon chemical tempering. Therefore, the amount of $K_2O$ is preferably limited as indicated above.

The term "$R_2O$" refers to the alkali metal oxides $Li_2O$, $Na_2O$ and $K_2O$. The glasses of the invention may comprise $Li_2O$, for example in an amount of from 0.1 mol-% to 1 mol-%. However, preferably, the glasses of the invention are free of $Li_2O$. $Li_2O$ is associated with increased costs and its availability may be limited, in particular due to alternative applications such as lithium-ion batteries. Preferably, $Na_2O$ is the main alkali metal oxide of the glasses of the invention. Preferably, the molar ratio of $Na_2O$ to $R_2O$ is in a range of from 0.75:1 to 1:1, more preferably from 0.85:1 to 0.95:1. In particular, this may be advantageous with respect to the hydrolytic resistance and with respect to the chemical tempering.

Preferably, the glasses of the invention comprise CaO in an amount of from 3.5 mol-% to 20 mol-%, more preferably from 4 mol-% to 15 mol-%, more preferably from 5 mol-% to 10 mol-%, more preferably from 6 mol-% to 9 mol-%, more preferably from 7.2 mol-% to 8 mol-%. CaO is an alkaline earth oxide and serves to adjust the viscosity of the glass (optimization of the melting behavior). CaO lowers the melting point of the glass so that it can be melted with less energy. In contrast, too high a calcium oxide content may worsen the ion exchange capacity/diffusivity of the glass to such an extent that the DoL value decreases. In addition, the ion exchange capacity of the exchange bath may be impaired, i.e. the ion exchange bath must be changed more frequently. Therefore, it is advantageous to adjust the amount of CaO to the ranges described above.

Preferably, the glasses of the invention comprise MgO in an amount of from 0.1 mol-% to 5 mol-%, more preferably from 0.2 mol-% to 1.5 mol-%, more preferably from 0.3 mol-% to 1 mol-%, more preferably from 0.4 mol-% to 0.5 mol-%. MgO may in particular be advantageous for adjusting the viscosity of the glass. MgO lowers the melting point of the glass and helps the glass to melt better. The ion exchange capability of the glass may be increased by MgO. However, if the amount of MgO is high, devitrification resistance may be impaired.

The term "RO" refers to the alkaline earth metal oxides MgO, CaO, BaO and SrO. The glasses of the invention may comprise BaO and/or SrO, for example in an amount of from 0.1 mol-% to 1 mol-% each. However, preferably, the glasses of the invention are free of BaO and/or SrO. Preferably, CaO is the main alkaline earth metal oxide of the glasses of the invention. Preferably, the molar ratio of CaO to RO is in a range of from 0.8:1 to 1:1, more preferably from 0.9:1 to 0.98:1. In particular, it is preferable that the molar ratio of CaO to the sum of CaO and MgO is larger than 0.5, more preferred at least 0.6, more preferred at least 0.7, in particular in a range of from 0.8:1 to 1:1, more preferably from 0.9:1 to 0.98:1. In other embodiments, the sum of the molar proportion of CaO and MgO may be higher than the molar proportion of CaO by a factor of at least 1.7.

Preferably, the glasses of the invention comprise $TiO_2$ in an amount of from 0 mol-% to 0.3 mol-%, more preferably from 0 mol-% to 0.2 mol-%, more preferably from 0 mol-% to 0.1 mol-%, more preferably from 0 mol-% to 0.05 mol-%. $TiO_2$ may contribute to improving the chemical resistance. However, particularly preferably, the glasses of the invention are free of $TiO_2$. $TiO_2$ may react with $Fe_2O_3$ and result in a yellow-brownish coloring of the glass. Therefore, it is preferable to limit the amount of $TiO_2$ in the glass.

Preferably, the glasses of the invention comprise $ZrO_2$ in an amount of from 0.1 mol-% to 10 mol-%, more preferably from 0.3 mol-% to 10 mol-%, more preferably from 0.4 mol-% to 5 mol-%, more preferably from 0.5 mol-% to 10 mol-%, more preferably from 0.6 mol-% to 1.5 mol-%. In particular, $ZrO_2$ may be used as a replacement for $TiO_2$. The amount of $ZrO_2$ is preferably at most 10 mol-%, more preferably at most 7.5 mol-%, more preferably at most 5 mol-%, for example at most 4.5 mol-%, at most 3 mol-%, or at most 1.5 mol-%. $ZrO_2$ may increase the hydrolytic resistance. In particular, $ZrO_2$ may stabilize the glass structure, for example by forming structural units of $[ZrO3]^{2-}$ and $Ca^{2+}$ which reduces the mobility of $Ca^{2+}$ ions. Furthermore, $ZrO_2$ may improve the ion exchangeability of the glasses so that higher CS values may be achieved. However, high amounts of $ZrO_2$ may increase the processing temperature and may decrease the devitrification resistance.

Preferably, the glasses of the invention comprise Cl in an amount of from 0.1 mol-% to 3 mol-%, more preferably from 0.2 mol-% to 2 mol-%, more preferably from 0.3 mol-% to 1 mol-%, more preferably from 0.4 mol-% to 0.6 mol-%. In particular, Cl may act as a refining agent.

The glasses of the invention may comprise $B_2O_3$, for example in an amount of at least 0.1 mol-%. However, the amount of $B_2O_3$ in the glasses of the invention is preferably less than 1 mol-%, more preferably less than 0.5 mol-%. $B_2O_3$ may compromise the ability of the glasses to be chemically tempered. Therefore, the glasses of the invention are preferably free of $B_2O_3$.

As described above, presence of both $Fe_2O_3$ and $TiO_2$ in the glass leads to an undesired yellow-brownish coloring of the glass. Reducing the amount of $Fe_2O_3$ requires use of particular pure raw material and is therefore associated with high costs. Therefore, aspects of the present invention relate to a reduced content of $TiO_2$ instead. In particular, it is preferred that the molar proportion of $Fe_2O_3$ in the glass is at least as high as the molar proportion of $TiO_2$. More preferably, the molar proportion of $Fe_2O_3$ in the glass is higher than the molar proportion of $TiO_2$.

As described above, $ZrO_2$ may be used as a replacement for $TiO_2$. Preferably, the molar proportion of $ZrO_2$ in the glass is higher than the molar proportion of $TiO_2$ by a factor of at least 5, more preferably at least 10, more preferably at least 20, more preferably at least 50. Likewise, the molar ratio of $ZrO_2$ to $Fe_2O_3$ is preferably higher than the molar ratio of $TiO_2$ to $Fe_2O_3$ by a factor of at least 5, more preferably at least 10, more preferably at least 20, more preferably at least 50. As described above, presence of both $Fe_2O_3$ and $TiO_2$ in the glass leads to an undesired yellow-brownish coloring of the glass. Therefore, it is advantageous to use $ZrO_2$ as a replacement for $TiO_2$. Furthermore, $ZrO_2$ is advantageous for another reason. Namely, the influence of $ZrO_2$ on CS and DoL is higher as compared to the respective influence of $TiO_2$. Thus, improved chemical toughening results are achieved with $ZrO_2$ as compared to $TiO_2$.

As described above, $Fe_2O_3$ may be present in the glasses of the invention. It is not necessary to use very pure raw materials for avoiding $Fe_2O_3$ which is a particular advantage of the invention. However, $Fe_2O_3$ should not be present in very high amounts. In particular, it is preferred that the amount of $Fe_2O_3$ is very low as compared to the amount of $ZrO_2$. Preferably, the molar proportion of $ZrO_2$ in the glass is higher than the molar proportion of $Fe_2O_3$ by a factor of at least 5, more preferably at least 10, more preferably at least 20, more preferably at least 50. However, the molar proportion of $ZrO_2$ in the glass is preferably higher than the molar proportion of $Fe_2O_3$ by a factor of at most 100.

As described above, both $Al_2O_3$ and $Na_2O$ are advantageous with respect to chemical tempering of the glass. Aluminosilicate glasses have a particular advantageous threshold diffusivity D as compared to borosilicate glasses. Furthermore, sodium is usually exchanged for potassium during chemical tempering so that a certain amount of $Na_2O$ is preferably present in the glass. However, the molar proportion of $Al_2O_3$ in the glass is preferably higher than the molar proportion of $Na_2O$. Preferably, the molar ratio of $Al_2O_3$ to $Na_2O$ is the range of from 1.05:1 to 1.35:1, more preferably from 1.1:1 to 1.3:1. This is particularly advantageous with respect to chemical resistance, hydrolytic resistance and ion exchangeability.

Preferably, the glasses of the invention comprise both $Al_2O_3$ and alkali metal oxides $R_2O$. However, it is preferred that the sum of the molar proportions of alkali metal oxides $R_2O$ not higher than the molar proportion of $Al_2O_3$. Preferably, the sum of the molar proportions of alkali metal oxides $R_2O$ is lower than the molar proportion of $Al_2O_3$. Preferably, the molar ratio of $R_2O$ to $Al_2O_3$ is from 0.8:1 to 1:1, more preferably from 0.85:1 to <1:1. This is particularly advantageous with respect to chemical resistance, hydrolytic resistance and ion exchangeability.

Interestingly, the molar ratio of $Al_2O_3$ to CaO was found to be relevant with respect to the ability of the glass to be chemically tempered. Preferably, the molar proportion of $Al_2O_3$ in the glass is higher than the molar proportion of CaO by a factor of at least 1.1, more preferably at least 1.2, more preferably at least 1.3, more preferably at least 1.4, more preferably at least 1.5. However, the molar ratio of $Al_2O_3$ to CaO should not be very high because otherwise the melting temperature may be increased significantly. Preferably, the molar proportion of $Al_2O_3$ in the glass is higher than the molar proportion of CaO by a factor of at most 2, more preferably at most 1.9, more preferably at most 1.8, more preferably at most 1.7, more preferably at most 1.6.

As described above, the glasses of the present invention are preferably aluminosilicate glasses. However, the glass preferably comprises other components as well as described above. Preferably, the sum of the molar proportions of $SiO_2$ and $Al_2O_3$ is in a range of from 70 mol-% to 90 mol-%, more preferably from 75 mol-% to 85 mol-%. Particularly preferably, the sum of the molar proportions of $SiO_2$ and $Al_2O_3$ is less than 82 mol-%.

When in this description it is mentioned that the glasses are free of a component or that they do not contain a certain component, then this means that this component is only allowed to be present as an impurity in the glasses. This means that it is not added in substantial amounts. Not substantial amounts are amounts of less than 300 ppm (molar), preferably less than 200 ppm (molar), more preferably less than 100 ppm (molar), particularly preferably less than 50 ppm (molar) and most preferably less than 10 ppm (molar). Preferably, the glasses of the invention are free of F, $SnO_2$ and/or $CeO_2$.

The glasses of the present invention have an excellent transmission. Preferably, the glass has a transmission of higher than 85%, more preferably higher than 90% at a wavelength of 400 nm at a sample thickness of 1 mm. Preferably, the glass has a transmission of higher than 85%, more preferably higher than 90% at a wavelength of 495 nm at a sample thickness of 1 mm. Preferably, the glass has a transmission of higher than 85%, more preferably higher than 90% at a wavelength of 670 nm at a sample thickness of 1 mm. Preferably, the glass has a transmission of higher than 75%, more preferably higher than 85% at a wavelength of 400 nm at a sample thickness of 10 mm. Preferably, the glass has a transmission of higher than 75%, more preferably higher than 85% at a wavelength of 495 nm at a sample thickness of 10 mm. Preferably, the glass has a transmission of higher than 75%, more preferably higher than 85% at a wavelength of 670 nm at a sample thickness of 10 mm. Preferably, the glass has a transmission at a sample thickness of 1 mm of at most 5% higher at 495 nm compared to at 400 nm. Preferably, the glass has a transmission at a sample thickness of 10 mm of at most 5% higher at 495 nm compared to at 400 nm. Preferably, the glass has a transmission at 400 nm of at most 5% lower at a sample thickness of 10 mm compared to at a sample thickness of 1 mm.

Preferably, the glass has a transmission of higher than 85%, more preferably higher than 90% at a wavelength of 400 nm and 495 nm and 670 nm at a sample thickness of 1 mm. Preferably, the glass has a transmission of higher than 75%, more preferably higher than 85% at a wavelength of 400 nm and 495 nm and 670 nm at a sample thickness of 10 mm.

Preferably, the glass has a transmission of higher than 85%, more preferably higher than 90% at a wavelength of 400 nm, 450 nm, 495 nm, 550 nm, 600 nm, 650 nm and 670 nm at a sample thickness of 1 mm. Preferably, the glass has a transmission of higher than 75%, more preferably higher than 85% at a wavelength of 400 nm, 450 nm, 495 nm, 550 nm, 600 nm, 650 nm and 670 nm at a sample thickness of 10 mm.

Preferably, the glasses of the present invention have a high transmission in the visual range. Preferably, the glass has a transmission of higher than 50%, more preferably higher than 60%, more preferably higher than 70%, more preferably higher than 80%, more preferably higher than 85%, more preferably higher than 90% at any wavelength in the entire wavelength region of from 380 nm to 780 nm at a sample thickness of 1 mm. Preferably, the glass has a transmission of higher than 50%, more preferably higher than 60%, more preferably higher than 70%, more preferably higher than 75%, more preferably higher than 80%, more preferably higher than 85% at any wavelength in the entire wavelength region of from 380 nm to 780 nm at a sample thickness of 10 mm.

Preferably, the glasses of the present invention have a high transmission in the visual range, in particular at a wavelength of 400 nm and of 495 nm and of 670 nm. Preferably, the transmission at 400 nm and at 495 nm and at 670 nm is very similar.

Preferably, the ratio of the transmission at 495 nm and the transmission at 400 nm is in a range of from 0.95:1 to 1.05:1, more preferably from 0.97:1 to 1.04:1, more preferably from 0.99:1 to 1.03:1, more preferably from 1:1 to 1.02:1 at a sample thickness of 1 mm and/or at a sample thickness of 10 mm. It is particular preferred that the transmission at 495 nm is higher as compared to the transmission at 400 nm. Most preferred, the ratio of the transmission at 495 nm and the transmission at 400 nm is in a range of from >1:1 to 1.015:1.

Preferably, the ratio of the transmission at 670 nm and the transmission at 495 nm is in a range of from 0.95:1 to 1.05:1, more preferably from 0.96:1 to 1.03:1, more preferably from 0.97:1 to 1.02:1, more preferably from 0.98:1 to 1.01:1 at a sample thickness of 1 mm and/or at a sample thickness of 10 mm.

Preferably, the ratio of the transmission at 670 nm and the transmission at 400 nm is in a range of from 0.95:1 to 1.05:1, more preferably from 0.96:1 to 1.04:1, more preferably from 0.97:1 to 1.03:1, more preferably from 0.98:1 to 1.02:1, more preferably from 0.99:1 to 1.01:1 at a sample thickness of 1 mm and/or at a sample thickness of 10 mm.

As described above, the glass of this invention is preferably chemically toughenable. Furthermore, the invention also relates to a toughened glass, in particular to a chemically toughened glass. Preferably, the ratio of central tension (CT) to compressive stress (CS) is in the range of 0.05 to 2.0. DoL is preferably in a range of from 20 µm to 100 µm, more preferably from 25 µm to 75 µm, more preferably from 30 µm to 60 µm, more preferably from 35 µm to 50 µm, in particular upon chemical toughening in $KNO_3$ at 450° C. for 12 hours. The central tension (CT) is preferably in a range of from 100 MPa to 200 MPa. The compressive stress (CS) is preferably in a range of from 750 MPa to 1000 MPa, more preferably from 800 MPa to 900 MPa. In particular preferred embodiments, a chemically toughened glass of the invention has a CS of at least 840 MPa and a DoL of at least 30 µm, more preferably a CS of at least 840 MPa and a DoL of at least 40 µm.

As described above, the color impression can be described based on the CIE 1931 color space that represents a color impression by a combination of three values, namely the x-value, the y-value and the z-value (chromaticity coordinates). It is preferably determined analogous to DIN 5033 using illuminant "C" at 6770 K for the CIE standard observer within a 2° arc of the fovea (CIE 1931 2° Standard Observer). Briefly, X, Y and Z standard spectral values are taken from the table of the CIE 1931 color space system and multiplied with the measured transmission values in order to obtain the respective tristimulus values.

The chromaticity coordinates x, y and z that are defining the color location or color position within the color space are obtained by normalizing the sum x+y+z to be equal to 1.

Thus, x-value, y-value and z-value are positive values and the sum x+y+z=1. The CIE 1931 color space chromaticity diagram represents the color space, wherein the x-axis refers to the x-values and the y-axis refers to the y-values. The z-value can be inferred from any given pair of x-value and y-value by calculating z=1−x−y. The point x=y=z=⅓ represents the so called "white point" that defines the color "white". High x-values represent reddish colors. High y-values represent greenish colors. High z-values represent bluish colors. Each chromaticity is represented as a particular color location in color space. Additive mixed colors have their color location on the straight connecting line of the components. For exactly characterizing the color stimulus specification, the tristimulus value Y is used as a brightness reference value (DIN 5033, Part 1) by dividing the sum of all y-values by a ratio (=21.293658). Thereby the resulting value is normalized to a maximum of 100. This value indicates whether the glass is brighter or darker for the human eye as compared to a comparative probe.

The x-value, y-value and z-value are positive values and the sum x+y+z=1. The CIE 1931 color space chromaticity diagram represents the color space, wherein the x-axis refers to the x-values and the y-axis refers to the y-values. The z-value can be inferred from any given pair of x-value and y-value by calculating z=1−x−y. The point x=y=z=⅓ represents the so called "white point" that defines the color "white". High x-values represent reddish colors. High y-values represent greenish colors. High z-values represent bluish colors.

Preferably, the x-value in the CIE 1931 color space is at least 0.30 and at most 0.35, more preferably at least 0.31 and at most 0.32 at a sample thickness of 1 mm and/or 10 mm. Preferably, the y-value in the CIE 1931 color space is at least 0.30 and at most 0.35, more preferably at least 0.31 and at most 0.32 at a sample thickness of 1 mm and/or 10 mm. Preferably, x-value and y-value are at least 0.30 and at most 0.35, more preferably at least 0.31 and at most 0.32 at a sample thickness of 1 mm and/or 10 mm.

As described above, a color impression of neutral white is desired, in particular in the field of pharmaceutical packaging. In contrast, a yellow-brownish color impression is undesired. A neutral white color impression is represented by x=y=z=⅓, which is therefore one potential embodiment of the invention at a sample thickness of 1 mm and/or 10 mm. However, a color impression slightly differing from neutral white is in fact even more preferred. Therefore, it is preferred that the z-value is higher than ⅓, preferably higher than 0.34, more preferably higher than 0.35, more preferably higher than 0.36, more preferably at least 0.37 or even higher than 0.37 at a sample thickness of 1 mm and/or 10 mm. However, the z-value should not be too high in order for the glass not to appear very blue. Particularly preferably, the z-value is in a range of from 0.37 to 0.38, more preferably from >0.37 to 0.375, more preferably from 0.371 to 0.374 at a sample thickness of 1 mm and/or 10 mm.

Generally, the z-value may be smaller at a sample thickness of 10 mm as compared to a sample thickness of 1 mm. For example, the difference of the z-value at a sample thickness of 1 mm and the z-value at a sample thickness of 10 mm may be in a range of from 0.0001 to 0.005, more preferably from 0.0005 to 0.002. Hence, at a sample thickness of 10 mm the z-value is preferably in a range of from >0.37 to 0.375, more preferably from 0.371 to 0.373.

Preferably, the ratio of z-value and x-value is in a range of from 1.1 to 1.3, more preferably from 1.15 to 1.25 at a sample thickness of 1 mm and/or 10 mm. Preferably, the ratio of z-value and y-value is in a range of from 1.05 to 1.3, more preferably from 1.1 to 1.25 at a sample thickness of 1 mm and/or 10 mm.

It turned out that the color impression of the glass is particularly advantageous if the y-value is higher than the x-value. However, the difference between y-value and x-value should not be too high. Preferably, the y-value in the CIE 1931 color space is higher than the x-value by a factor of at most 1.1 at a sample thickness of 1 mm and/or 10 mm. Preferably, the ratio of y-value and x-value is in a range of from >1:1 to 1.05:1, more preferably from 1.01:1 to 1.03:1, more preferably from 1.015:1 to 1.025:1 at a sample thickness of 1 mm and/or 10 mm.

Preferably, the x-value is in a range of from 0.31 to 0.312, more preferably from 0.31 to 0.311 at a sample thickness of 1 mm and/or 10 mm. Preferably, the y-value is in a range of from 0.316 to 0.318 at a sample thickness of 1 mm and/or 10 mm. Preferably, the y-value is in a range of from 0.316 to 0.317 at a sample thickness of 1 mm and/or the y-value is in a range of from 0.317 to 0.318 at a sample thickness of 10 mm. Preferably, the x-value is in a range of from 0.31 to 0.312, more preferably from 0.31 to 0.311 at a sample thickness of 1 mm and/or 10 mm and the y-value is in a range of from 0.316 to 0.318 at a sample thickness of 1 mm and/or 10 mm. Preferably, the x-value is in a range of from 0.31 to 0.312, more preferably from 0.31 to 0.311 at a sample thickness of 1 mm and/or 10 mm and the y-value is in a range of from 0.316 to 0.317 at a sample thickness of 1 mm and/or in a range of from 0.317 to 0.318 at a sample thickness of 10 mm.

Generally, the y-value may be higher at a sample thickness of 10 mm as compared to a sample thickness of 1 mm. For example, the difference of the y-value at a sample thickness of 10 mm and the y-value at a sample thickness of 1 mm may be in a range of from 0.0005 to 0.002, more preferably from 0.00075 to 0.0015.

When reference is made to a "sample thickness", the thickness indicates the thickness of the sample on which the respective parameter can be measured. The sample thickness does not refer to the actual thickness of the glass or a glass article, the thickness of the glass or a glass article is in no way limited to the sample thickness.

Preferably, the glass has a y-value of at most 10%, more preferably at most 5%, more preferably at most 1%, more preferably at most 0.5% higher at a sample thickness of 10 mm compared to at a sample thickness of 1 mm. Preferably, the y-value is higher at a sample thickness of 10 mm as compared to a sample thickness of 1 mm by 0.1% to 0.5%, more preferably by 0.25% to 0.4%.

Preferably, the glass has a z-value of at most 10%, more preferably at most 5%, more preferably at most 1%, more preferably at most 0.5% lower at a sample thickness of 10 mm compared to at a sample thickness of 1 mm. Preferably, the z-value is lower at a sample thickness of 10 mm as compared to a sample thickness of 1 mm by 0.1% to 0.5%, more preferably by 0.15% to 0.4%.

Preferably, the glass has an average linear thermal expansion coefficient CTE in the temperature range between 25° C. and 300° C. of more than $3*10^{-6}/°C$.

Preferably, the glass of the invention has a thickness of from 0.1 to 5 mm, more preferably of from 0.4 to 2.5 mm. Preferably, the glass of the invention is a glass tube, in particular a glass tube having a wall thickness of from 0.1 to 5 mm, more preferably of from 0.4 to 2.5 mm.

The glass has a consumption of hydrochloric acid per g of glass grain in the glass grains test of at most 0.081 ml/g, preferably less than 0.080 ml/g, more preferably less than 0.079 ml/g according to USP660.

Preferably, the glass does not devitrify at a temperature of from 800° C. to 1500° C.

The devitrification resistance may be expressed in terms of KGmax. The lower KGmax, the higher the devitrification resistance. KGmax means the maximum crystallization rate in μm/min. The measurement of the crystallization rate is well known. The crystallization rate is measured along the formed crystals, i.e. at their greatest extension. In particular, the crystallization rate is determined upon subjecting the glass to gradient tempering (for example using a gradient furnace).

The so-called lower devitrification temperature (LDT) is the temperature at which devitrification starts in an increasing temperature regimen. Above the liquidus temperature (also called upper devitrification temperature (UDT)) crystals do not occur even after longer times. The values of LDT and UDT generally differ between different glasses. The terms "crystallization" and "devitrification" are used synonymously herein if not indicated otherwise.

If there is crystallization, it occurs at temperatures above the lower devitrification temperature (LDT) and below the upper devitrification temperature (UDT), thus in a range between LDT and UDT. Consequently, the temperature at which the crystallization rate has its maximum value is between LDT and UDT. The glass has to be heated to temperatures between LDT and UDT in order to determine KGmax. Generally, different temperatures within the range of from LDT to UDT are tested because it is often unknown at which temperatures exactly the maximum crystallization occurs. This also enables determining LDT and UDT as the lower limit and upper limit, respectively, of the temperature range in which crystallization occurs.

The crystallization rate is preferably determined by thermally treating the glass for a time of one hour in a gradient furnace with increasing temperature regimen. A gradient furnace is a furnace having different heating zones, thus a furnace having areas of different temperatures. Increasing temperature regimen means that prior to be put into the furnace the temperature of the glass is lower than the temperature in any area of the furnace. Thus, the temperature of the glass is increased by putting it into the furnace independent of which area of the furnace the glass is put into. Hence, measurement of devitrification is preferably done by thermal treatment for one hour in a (preheated) gradient furnace that has zones of different temperatures. It is a location-based gradient, not a time-based gradient, because the gradient furnace is divided into locations or zones of different temperatures.

The furnace being divided into several heating zones enables testing different temperatures at the same time. This is a particular advantage of a gradient furnace. For example, the lowest temperature may be 800° C. and the highest temperature may be 1500° C., the lowest temperature may be 1025° C. and the highest temperature may be 1210° C. the lowest temperature may be 1050° C. and the highest temperature may be 1450° C., the lowest temperature may be 1100° C. and the highest temperature may be 1395° C., or the lowest temperature may be 1060° C. and the highest temperature may be 1185° C. The temperatures shall be chosen such that the crystallization rate can be determined at different temperatures in the range between LDT and UDT so that comparison of potentially different crystallization rates in that range enables determining KGmax as the maximum crystallization rate. If LDT and UDT are unknown, it is preferred that temperatures in a relatively large range are tested in order to enable determination of LDT and UDT. For example, the lowest temperature in the gradient furnace may be chosen such that it is about 350 K below the processing temperature (VA) of the glass.

Preferably, the glasses of the invention are so devitrification resistant that KGmax is preferably at most 0.05 μm/min, more preferably at most 0.02 μm/min, more preferably at most 0.01 μm/min in a temperature range of from 800° C. to 1500° C., for example from 1025° C. to 1210° C., from 1050° C. to 1450° C., from 1100° C. to 1395° C., or from 1060° C. to 1185° C., when the glass is thermally treated for 60 minutes in a gradient furnace with increasing temperature regimen. Most preferably, no devitrification occurs at all. Importantly, if no devitrification occurs at all during gradient tempering, KGmax cannot be determined. No devitrification may also be expressed as KGmax=0 μm/min.

Notably, the fact that a glass has a maximum crystallization rate (KGmax) of at most 0.05 μm/min in a temperature range of from 800° C. to 1500° C. when the glass is thermally treated for 60 minutes in a gradient furnace with increasing temperature regimen does not mean that the gradient furnace has to cover the entire range of from 800° C. to 1500° C. For example, if it is known for a given glass that UDT is 1200° C., temperatures of more than 1200° C. do not have to be tested in the gradient furnace because there is no crystallization at such temperatures so that the maximum crystallization rate KGmax has to be at temperatures below 1200° C. Likewise, if UDT is known to be 1450° C., 1395° C., 1210° C., or 1185° C., temperatures of more than 1450° C., 1395° C., 1210° C., or 1185° C., respectively, do not have to be tested in the gradient furnace.

Preferably, the crystallization rate is determined using glass grains, in particular glass grains of 1.6 mm to 4 mm diameter. Such glass grains are preferably put onto a carrier, such as a platinum carrier for the gradient tempering. For example, the carrier may have depressions, each for taking up a glass grain, and a hole at the bottom of each depression so that the crystallization rate can be determined microscopically. In view of the preferred sizes of glass grains the depressions preferably have a diameter of 4 mm each and the holes preferably have a diameter of 1 mm each.

Subsequent to the thermal treatment it can be determined microscopically which crystallization rate occurred in which temperature range. The highest crystallization rate that is determined is the maximum crystallization rate KGmax. LDT and UDT may be determined as lower limit and upper limit, respectively, of the temperature range in which crystallization occurred. The different glass grains can easily be assigned to the different temperature zones of the gradient furnace because it is known which position in the furnace has which temperature and which glass grain was located at which position in the furnace during the thermal treatment.

The glass of the invention is useable for the production of vessels, in particularly pharmaceutical vessels.

In an aspect, the present invention relates to a method for the production of a glass of the invention comprising the steps: melting of glass raw materials, cooling of the obtained glass.

In an aspect, the present invention relates to a method for the production of a glass of the invention comprising the step: processing a glass melt, in particular by means of down draw, overflow fusion, redrawing, floating or a tube drawing method, in particular the Danner process, the Vello process or Vertical draw.

In some aspects, the method comprises the step of: toughening the glass by physical and/or chemical toughening.

Chemical toughening is particularly preferred. Preferably, chemical toughening comprises an ion exchange process. Preferably, the ion-exchange process comprises immersing the glass or a part of the glass into a salt bath containing monovalent cations. Preferably, the monovalent cations are potassium ions, sodium ions or a mixture of potassium ions and sodium ions. Potassium ions are particularly preferred. Preferably, $KNO_3$ is used. Preferably, chemical toughening is done at a temperature of from 320° C. to 700° C., more preferably 400° C. to 500° C. Preferably, the total duration of chemical toughening is between 5 min and 48 hours, more preferably between 1 hour and 24 hours, more preferably between 4 hours and 15 hours, more preferably between 5 hours and 12 hours. Chemical toughening in $KNO_3$ at 450° C. for 9 hours is particularly preferred.

The glass can be in any form. The glass according to the invention can be, for example, a glass container, a glass sheet, a glass plate, a glass rod, a glass tube, a glass block or another article that is useful in, for example, the pharmaceutical or medical field.

The invention also relates to pharmaceutical primary packaging comprising the glass of the invention. The pharmaceutical primary packaging is preferably selected from bottles, for example large or small bottles, such as injection bottles or vials, ampoules, cartridges, bottles, flasks, phials, beakers or syringes.

The term "pharmaceutical primary packaging" is to be understood as packaging made of glass that comes into direct contact with a medicament. The packaging protects the medicament from environmental influences and maintains the medicament according to its specification until it is used by the patient.

The glass in the form of glass containers can be used as pharmaceutical primary packaging. The glass may be in contact with liquid contents such as active ingredient solutions, solvents, e.g. buffer systems, or the like, which may have a pH in range from 1 to 11, in the pH range from 4 to 9, or in the pH range from 5 to 7. The glasses show particularly good chemical resistance and are therefore particularly suitable for storage or preservation of these contents. A particularly good chemical resistance in the context of the present invention means that the glasses meet the requirements for storage and preservation of liquid contents applicable to the pharmaceutical sector to a high degree, in particular that the glasses have a hydrolytic resistance corresponding to hydrolytic class 1 according to ISO 720 or USP660.

The glasses according to the invention are suitable for the manufacture of pharmaceutical containers which are in contact with their contents and can therefore be provided for the storage and preservation of those contents. Contents that may be used are, for example, all solid and liquid compositions used in the pharmaceutical field.

The properties of the glass make it very suitable for the widest variety of applications, such as e.g. use as pharmaceutical primary packaging such as cartridges, syringes, ampoules or vials, since the substances stored in the containers, in particular aqueous solutions, do not attack the glass to any appreciable extent.

The invention also relates to a pharmaceutical product, including the glass of the invention, and a drug formulation. The drug formulation may contain a biological drug, such as an antibody, enzyme, protein, peptide or the like, and one or more pharmaceutically acceptable excipients.

The glass in accordance with the invention may also be an intermediate product in the manufacture of another glass article, such as tubular glass in the form of semi-finished products, for example for further processing into pharmaceutical primary packaging.

TABLE 1 shows the composition of the examples E1-E3 and the comparative examples C1-C3 in mol-%.

TABLE 1

| Component | E1 | E2 | E3 | C1 | C2 | C3 |
|---|---|---|---|---|---|---|
| $SiO_2$ | 68.0 | 68.1 | 68.1 | 68.5 | 69.0 | 75.8 |
| $Al_2O_3$ | 12.1 | 11.65 | 11.5 | 11.2 | 11.5 | 5.73 |
| $Na_2O$ | 9.7 | 9.97 | 9.7 | 10.1 | 9.5 | 11.4 |
| $K_2O$ | 1.1 | 1.15 | 1.2 | 0.98 | 1.128 | 0.09 |
| MgO | 0.5 | 0.49 | 0.5 | — | 0.4 | 6.59 |
| CaO | 7.6 | 7.61 | 7.4 | 7.0 | 7.15 | 0.36 |
| Cl | 0.39 | 0.42 | 0.4 | — | 0.39 | 0.025 |
| F | — | — | — | 0.7 | — | — |
| $ZrO_2$ | 0.6 | 0.6 | 1.2 | — | — | — |
| $TiO_2$ | 0.008 | 0.008 | — | 1.48 | 0.93 | — |
| $Fe_2O_3$ | 0.009 | 0.0094 | 0.0044 | 0.0053 | 0.0024 | 0.0054 |
| $SnO_2$ | — | — | — | 0.02 | — | — |
| $CeO_2$ | — | — | — | 0.01 | — | — |

Example glasses E1 to E3 comprise $ZrO_2$ instead of $TiO_2$. This enables use of less pure raw materials comprising $Fe_2O_3$ resulting in reduced costs without compromising the desired close to neutral white color impression of the glasses.

The glass of comparative example C1 showed a yellowish tinge.

Hydrolytic Resistance

TABLE 2 shows the results of a hydrolytic resistance test according to USP660 (Glass Grains). Briefly, glass grains were treated according to USP660 Glass Grains Test. The eluate was analyzed with flame atomic absorption spectrometry (F-AAS) to obtain values for $Na_2O$, $K_2O$, MgO and CaO (in mg/l). An $Na_2O$ equivalent value was obtained as a weighted sum of these values. The contribution of the respective oxides to the weighted sum was determined based on the ratio of the molecular weight of $Na_2O$ to the molecular weight of $K_2O$, MgO or CaO, respectively. For example, the weighting factor for $K_2O$ is calculated as follows:

$$M(Na_2O)/M(K_2O)=[61.979/(2*39.098+15.999)]$$
$$=0.658$$

This factor is also described in DIN ISO 4802-2:2017. The $Na_2O$ equivalent value was obtained as the sum of the value obtained for $Na_2O$ and the accordingly weighted values of $K_2O$, MgO and CaO.

All values can easily be converted from mg/l to µg/g in order to determine the percentage of the limit type I of USP660. Briefly, the limit type I of USP660 corresponds to 62 µg $Na_2O$ equivalent per g of glass grains. For example, a value of 53.28 µg $Na_2O$ equivalent per g of glass grains corresponds to about 86% of limit type I of USP660.

TABLE 2

| Component | E1 | E3 | C1 | C2 | C3 |
|---|---|---|---|---|---|
| $Na_2O$ [mg/l] | 7.2 | 6.7 | 8.08 | 7.80 | 16.08 |
| $K_2O$ [mg/l] | 0.42 | 0.53 | 0.49 | 0.53 | 0.05 |
| MgO [mg/l] | 0.08 | 0.10 | — | 0.10 | 0.22 |
| CaO [mg/l] | 1.9 | 1.93 | 2.04 | 2.00 | 0.23 |
| $Na_2O$ equiv./g grains [mg/l] | 9.70 | 9.34 | 10.66 | 10.51 | 16.71 |
| $Na_2O$ [µg/g] | 36.00 | 33.50 | 40.40 | 39.00 | 80.40 |
| $K_2O$ [µg/g] | 2.10 | 2.65 | 2.45 | 2.65 | 0.23 |

TABLE 2-continued

| Component | E1 | E3 | C1 | C2 | C3 |
|---|---|---|---|---|---|
| MgO [µg/g] | 0.40 | 0.50 | 0.00 | 0.50 | 1.12 |
| CaO [µg/g] | 9.50 | 9.65 | 10.20 | 10.00 | 1.16 |
| Na$_2$O equiv./g grains [µg/g] | 48.49 | 46.68 | 53...28 | 52...56 | 83...55 |
| Limit Type I (according to USP 660)* | 78% | 75% | 86% | 85% | 135% |

*the specified percentages indicate the extent to which the value corresponds to the limit of 0.10 ml consumption of 0.02 N HCl per g of glass grains. Notably, the respective limit type I also corresponds to 62 µg Na$_2$O equivalent per g of glass grains as described above.

The hydrolytic resistance of E2 was comparable to the hydrolytic resistance of E1.

The results show that the glasses of the present invention have a hydrolytic resistance class I (type I according to USP660/Glass Grains). In fact, the hydrolytic resistance of the glasses of the invention is better as compared to the comparative examples because E1 to E3 achieve a hydrolytic resistance corresponding to less than 80% of the limit type I. In contrast, the comparative examples do not achieve such values. C1 to C3 have a hydrolytic resistance corresponding to more than 80% of the limit type I. C3 even has 135% of limit type I and is therefore only type II according to USP660.

In summary, the glasses of the invention have an excellent hydrolytic resistance that is better as compared to the comparative examples.

Chemical Toughening

Chemical toughening was done in KNO$_3$ at 450° C. for varying time spans. The results are shown in the following TABLE 3.

TABLE 3

| Toughening conditions | Compressive stress layer | E2 | E3 | C1 | C2 | C3 |
|---|---|---|---|---|---|---|
| 450° C., 5 h | CS [MPa] | 861 | 865 | | | |
| 450° C., 5 h | DoL [µm] | 29 | 29 | | | |
| 450° C., 6 h | CS [MPa] | 848 | 873 | 846 | 792 | 751 |
| 450° C., 6 h | DoL [µm] | 32 | 32 | 47 | 32 | 38 |
| 450° C., 9 h | CS [MPa] | 841 | 855 | 787 | 796 | 636 |
| 450° C., 9 h | DoL [µm] | 40 | 40 | 56 | 32 | 48 |
| 450° C., 12 h | CS [MPa] | 836 | 853 | 843 | | 712 |
| 450° C., 12 h | DoL [µm] | 45 | 44 | 65 | | 53 |

As described above, the threshold diffusivity D can be calculated from DoL and chemical tempering time t according to the following formula: DoL=1.4*sqrt(4*D*t). In this disclosure, D is given for chemical tempering in KNO$_3$ at 450° C. for 9 hours.

Based thereon it can be calculated that the threshold diffusivity D of E2 and E3 is about 22.7 µm$^2$/h. The threshold diffusivity of C1 is about 44.4 µm$^2$/h, the threshold diffusivity of C2 is about 14.5 µm$^2$/h and the threshold diffusivity of C3 is about 32.7 µm$^2$/h.

Thus, the glasses of the invention are well suitable for chemical toughening.

Optical Properties

The refractive index of the example glasses E1 to E3 was 1.513. The refractive index of C1 was 1.515 and the refractive index of C2 was 1.516.

Optical properties of glass tubes having a wall thickness of 1 mm or 10 mm were determined. Thus, the sample thickness was 1 mm or 10 mm, respectively. In particular, the transmission was determined at a wavelength of 400 nm, at a wavelength of 495 nm and at a wavelength of 670 nm.

The x-values and y-values of the CIE 1931 color space were determined according to DIN 5033. The results are shown in the following TABLE 4, where samples were measured in duplicates with the mean values being presented.

TABLE 4

| Glass | Sample thickness | Transmission at 400 nm | Transmission at 495 nm | Transmission at 670 nm | x-value | y-value |
|---|---|---|---|---|---|---|
| E2 | 1 mm | 91.34% | 91.73% | 91.80% | 0.3103 | 0.3165 |
| E2 | 10 mm | 89.39% | 90.63% | 89.34% | 0.31015 | 0.3174 |
| E3 | 1 mm | 91.07% | 91.44% | 91.74% | 0.3104 | 0.31655 |
| E3 | 10 mm | 89.27% | 89.81% | 90.07% | 0.3108 | 0.3175 |
| C1 | 1 mm | 87.59% | 90.91% | 91.76% | 0.31155 | 0.3182 |
| C1 | 10 mm | 59.24% | 83.78% | 89.38% | 0.3223 | 0.33365 |

The color location in the CIE 1931 color space of glasses E2, E3 and C1 is shown in FIG. 1.

The data show that comparative example C1 has a disadvantageous color position with high x-values and high y-values, in particular at a sample thickness of 10 mm. In particular, the very advantageous x-values smaller than 0.311 and the very advantageous y-values smaller 0.318 can only be reached with the glasses of the present invention.

Thus, the glasses of the invention have very good optical properties.

Devitrification

The devitrification resistance may be expressed in terms of KG$_{max}$. The lower KG$_{max}$, the higher the devitrification resistance. KG$_{max}$ means the maximum crystallization rate in µm/min. The measurement of the crystallization rate is well known. The crystallization rate is measured along the formed crystals, i.e. at their greatest extension.

Briefly, the crystallization rate was determined by thermally treating the glass for 60 minutes in a gradient furnace with increasing temperature regimen. Importantly, if no devitrification occurs at all during gradient tempering, KG$_{max}$ cannot be determined.

The crystallization rate was determined using glass grains of 1.6 mm to 4 mm diameter. The glass grains were put onto a platinum carrier for the gradient tempering. The carrier had depressions, each for taking up a glass grain, and a hole at the bottom of each depression for optical inspection so that the crystallization rate was determined microscopically. The depressions had a diameter of 4 mm each and the holes had a diameter of 1 mm each.

No devitrification was detected for example glass E3 in the temperature range of from 1060° C. to 1185° C. No devitrification was detected for glasses E1, E2 and C2 in the temperature range of from 1100° C. to 1395° C. In contrast, there was devitrification of comparative example C1 in the temperature range of from 1100° C. to 1395° C. (KG$_{max}$=0.01 µm/min).

Thus, the glasses of the invention have a very good devitrification resistance.

FIG. 1 shows the position of example glasses E2 and E3 as well as comparative examples C1 and C2 in in the CIE 1931 color space. The x-axis refers to the x-values and the y-axis refers to the y-values.

Figure 2:
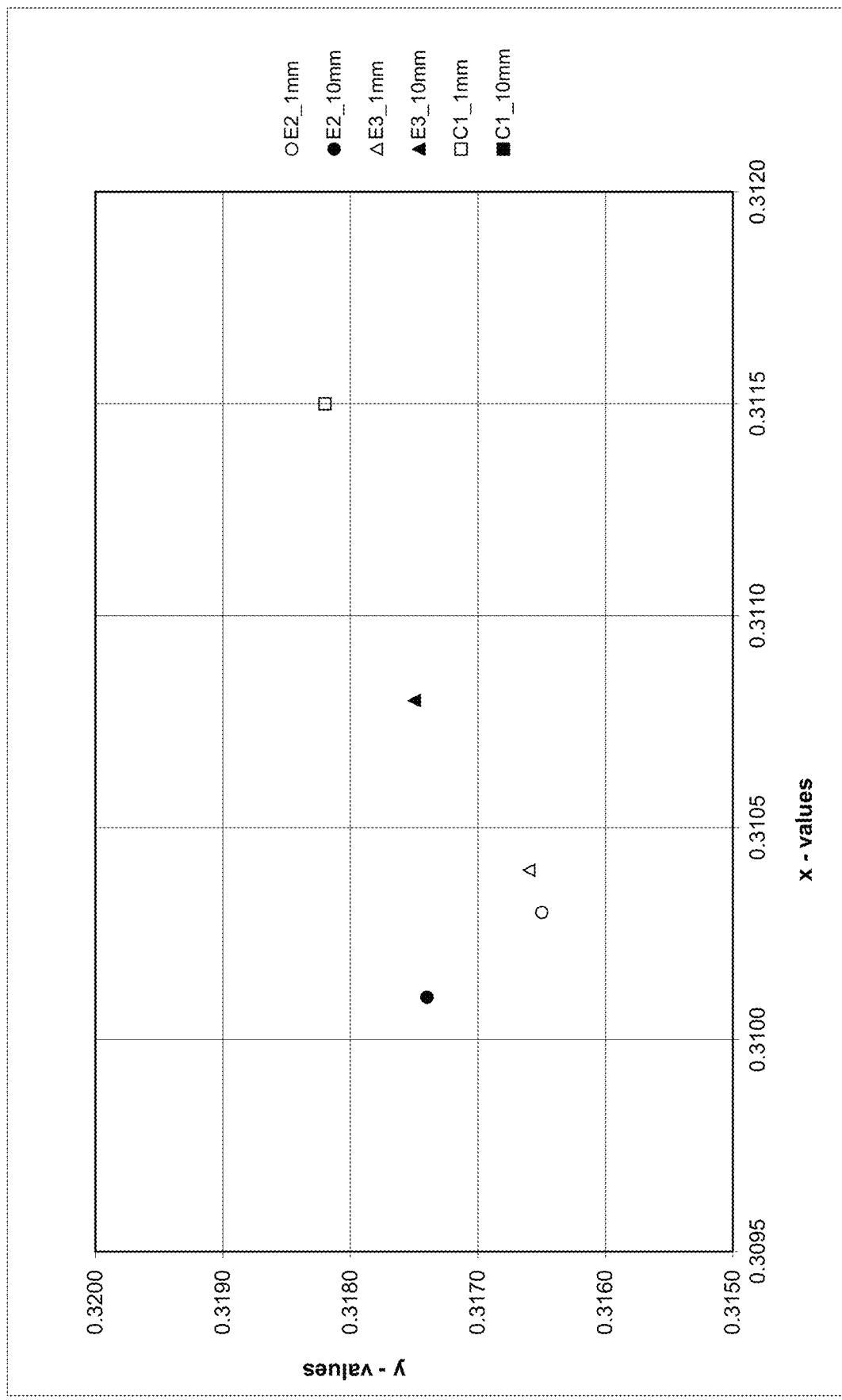
FIG. 2 shows an enlarged view of FIG. 1 focused on x-values of from 0.314 to 0.32 and y-values from 0.308 to 0.314.

FIG. 2 shows an enlarged view of FIG. 1 focused on x-values of from 0.314 to 0.32 and y-values from 0.308 to 0.314. The position of comparative example C1 with a thickness of 10 mm is outside the focused area and thus not shown in FIG. 2.

What is claimed is:

1. A silicate glass, comprising:
   a threshold diffusivity D of at least 6 μm²/hour;
   a hydrolytic resistance corresponding to at most 80% of a limit type I according to USP660/Glass Grains;
   a composition comprising at least 12 ppm $Fe_2O_3$ based on mol-%; and
   a sum of a z-value and an x-value that is higher than a y-value by a factor of at least 1.5 according to a CIE 1931 color space when measured at a sample thickness of 1 mm.

2. The glass of claim 1, wherein the composition comprises less than 500 ppm of $TiO_2$.

3. The glass of claim 1, wherein the composition comprises from 0.4 mol-% to 5 mol-% of $ZrO_2$.

4. The glass of claim 1, wherein the composition comprises less than 1 mol-% of $B_2O_3$.

5. The glass of claim 1, wherein the composition comprises a molar proportion of $Al_2O_3$ that is higher than a molar proportion of $Na_2O$.

6. The glass of claim 1, wherein the composition comprises a sum of molar proportions of alkali metal oxides that is lower than a molar proportion of $Al_2O_3$.

7. The glass of claim 1, wherein the composition comprises a molar ratio of CaO to a sum of CaO and MgO that is larger than 0.5.

8. The glass of claim 1, wherein the composition further comprises, based on mol-%:

| | |
|---|---|
| $SiO_2$ | 55-85; |
| $Al_2O_3$ | 5-25; |
| $Na_2O$ | 5-20; |
| $K_2O$ | 0.5-5; |
| CaO | 3.5-20; |
| MgO | 0.1-5; |
| $Fe_2O_3$ | 0.0012-0.1; |
| $TiO_2$ | 0-0.3; |
| $ZrO_2$ | 0.1-10; and |
| Cl | 0.1-3. |

9. The glass of claim 2, wherein the composition comprises less than 1 mol-% of $B_2O_3$.

10. The glass of claim 2, wherein the composition comprises a molar proportion of $Al_2O_3$ that is higher than a molar proportion of $Na_2O$.

11. The glass of claim 2, wherein the composition comprises a sum of molar proportions of alkali metal oxides that is lower than a molar proportion of $Al_2O_3$.

12. The glass of claim 1, wherein the composition comprises a molar ratio of CaO to a sum of CaO and MgO that is larger than 0.5.

13. The glass of claim 1, further comprising a transmission of higher than 85% at a wavelength of 400 nm, at the wavelength of 495 nm, and at the wavelength of 670 nm when measured at a sample thickness of 1 mm and when measured at a sample thickness of 10 mm.

14. The glass of claim 1, further comprising a ratio of transmission at 495 nm to transmission at 400 nm that is in a range of from 0.95:1 to 1.05:1 when measured at a sample thickness of 1 mm and when measured at a sample thickness of 10 mm.

15. The glass of claim 1, further comprising, in the CIE 1931 color space, a ratio of the z-value to the x-value is in a range of from 1.1 to 1.3 when measured at a sample thickness of 1 mm and/or 10 mm and a ratio of the z-value to the y-value is in a range of from 1.05 to 1.3 when measured at a sample thickness of 1 mm and/or 10 mm.

16. The glass of claim 1, further comprising, in the CIE 1931 color space, a ratio of the y-value to the x-value is in a range of from >1:1 to 1.05:1 when measured at a sample thickness of 1 mm and/or 10 mm.

17. The glass of claim 1, further comprising a maximum crystallization rate ($KG_{max}$) that is at most 0.05 μm/min in a temperature range of from 800° C. to 1500° C. when the glass is thermally treated for 60 minutes in a gradient furnace with an increasing temperature regimen.

18. The glass of claim 17, wherein the glass has a DoL that is in a range of from 20 μm to 100 μm and a compressive stress (CS) that is in a range of from 750 MPa to 1000 MPa.

19. The glass of claim 1, wherein the glass is chemically toughened.

20. The glass of claim 1, wherein the glass is configured as a pharmaceutical primary packaging.

21. The glass of claim 1, wherein the glass is configured as a device selected from a group consisting of a bottle, a vial, an ampoule, a cartridge, a flask, a phial, a beaker, and a syringe.

* * * * *